(12) United States Patent
Ha et al.

(10) Patent No.: US 7,125,244 B2
(45) Date of Patent: Oct. 24, 2006

(54) IN-LINE ROBOT MOUNT

(75) Inventors: Gerry Ha, Thornhill (CA); Waldemar J. Wieczorek, Mississauga (CA); John Arzuman, Toronto (CA)

(73) Assignee: Husky Injection Molding Systems Ltd., Bolton (CA)

( * ) Notice: Subject to any disclaimer, the term of this patent is extended or adjusted under 35 U.S.C. 154(b) by 433 days.

(21) Appl. No.: 10/455,370

(22) Filed: Jun. 6, 2003

(65) Prior Publication Data

US 2004/0247737 A1 Dec. 9, 2004

(51) Int. Cl.
*B29C 45/42* (2006.01)

(52) U.S. Cl. ...................................... 425/556; 425/444

(58) Field of Classification Search ................ 425/438, 425/444, 451.9, 556; 264/334
See application file for complete search history.

(56) References Cited

U.S. PATENT DOCUMENTS

| 2,171,326 A | 8/1939 | Tarbet ............................. 14/16 |
| 4,221,532 A | 9/1980 | Vance ......................... 414/729 |
| 4,637,738 A | 1/1987 | Barkley ........................ 384/38 |
| 4,781,571 A | 11/1988 | Heindl et al. ................ 425/556 |
| 4,884,003 A | 11/1989 | Hayes ........................ 310/328 |
| 4,928,936 A | 5/1990 | Ohkubo et al. ................ 269/73 |
| 5,061,169 A * | 10/1991 | Yamashiro et al. .......... 425/190 |
| 6,249,985 B1 | 6/2001 | Piko et al. ..................... 33/503 |
| 6,386,859 B1 * | 5/2002 | Hehl .......................... 425/556 |

FOREIGN PATENT DOCUMENTS

| DE | 86 06 557 | 4/1986 |
| WO | WO 92/19434 | 11/1992 |

* cited by examiner

*Primary Examiner*—Donald Heceknberg (57) ABSTRACT

A method and apparatus for mounting an in-line robot includes structure and/or steps for mounting a beam having an axis of travel. The in-line robot is preferably mounted on an injection molding machine. At least two mountings are provided, with a first mounting provided on a stationary platen of said injection molding machine, and a second flexible mounting provided on a portion of a clamping assembly. Preferably, the second flexible mounting is provided on a clamp block. The flexible mounting includes a first structure for fastening to a portion of the clamping assembly, and a second structure for fastening to the beam. The flexible mounting also includes a spacer extending between the first and second structures for fastening, and the spacer is attached to the first and second structures for fastening by first and second connectors, respectively. The flexible mounting permits secure fastening of the beam to the clamping assembly regardless of any changes in the position of the clamping assembly with respect to the beam.

26 Claims, 11 Drawing Sheets

IN-LINE ROBOT MOUNT

BACKGROUND OF THE INVENTION

1. Field of the Invention

The present invention relates to a method and apparatus for mounting an in-line robot having at least two mounts, where at least one mount is a fixed mount and at least one mount is a flexible mount. In particular, the present invention relates to method and apparatus for mounting a robot on top of an injection molding machine using at least one stationary mount and at least one flexible mount, said stationary mount provided on a stationary platen, and said flexible mount provided on a clamp assembly. The present invention also relates to a flexible mount for use in a method and apparatus for mounting a first object on a second object that is subject to expansion and contraction. The method and apparatus are particularly well suited for mounting in-line robots on injection molding machines, especially where those robots are used to retrieve injection molded materials from open molds after the molding process has been completed.

2. Related Art

A variety of mountings for affixing robots to injection molding machines have been utilized. Robots that are known as "in-line robots" have an axis of travel that is parallel to the axis of a clamping force applied to mold halves in the injection molding machine, where that axis of travel permits the in-line robot to travel beyond the end of the clamping assembly.

Known robot mountings, particularly those for in-line robots, suffer from several defects, including:

lack of stability and lack of durability of mountings utilizing support arms that are attached to the base of the injection molding machine; and requirement for support structures that extend beyond the footprint of the injection molding machine thereby occupying valuable floor space that can be otherwise used for hose and cable routing.

Obstruction of the machine components for the purpose of machine maintenance.

Examples of robots mounted on injection molding machines are shown in U.S. Pat. No. 4,221,532 to Vance, U.S. Pat. No. 4,781,571 to Heindl et al., and PCT Published Application WO 92/19434 to Engel.

U.S. Pat. No. 4,221,532 discloses an apparatus for transferring articles between two mutually spaced locations. The apparatus may be used to remove a molded product from the mold cavity of an injection molding machine. Bearings 75 and 80 support drive shaft 70 and permit longitudinal and rotational movement. Bearing 75 may be supported on movable mold carrying platen 30. The robot discharges the parts at the side of the injection molding machine and consequently is not an "in-line robot".

U.S. Pat. No. 4,781,571 discloses an injection molding machine with an apparatus for removing injection molded articles. In FIG. 1, a principal axis of travel for the apparatus is shown to be aligned parallel relative to the direction of actuation of the closing unit for the injection molding machine and to extend beyond both ends of the injection molding machine. FIG. 2 shows a guide bed 8 upon which the robot travels that is mounted to the frame or housing of the injection molding machine by several support arms 9. FIG. 3 is a plan view that shows three support arms 9, and all of them are attached to the machine base rather than the platens 4a and 4b or the clamp assembly.

PCT Published Application WO 92/19434 discloses a device for removing molded plastic parts from the space between clamping plates bearing mold halves in an injection molding machine. The handling device has a pivoting gripping arm movable along an axis running parallel to the longitudinal direction of the machine.

Figure 11:
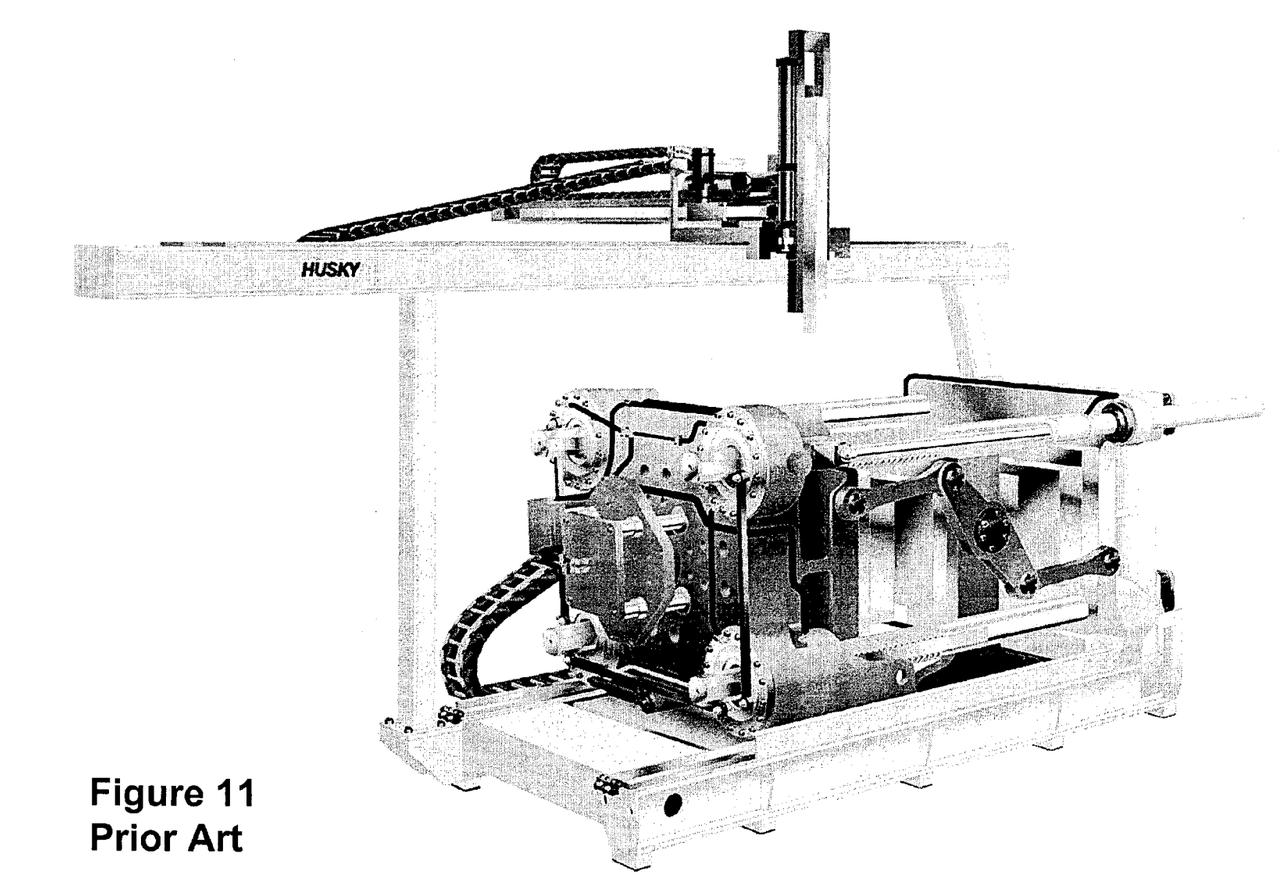
FIG. 11 is an isometric view of a prior art mounting for a robot assembly on an injection molding machine

An existing robot device depicted in FIG. 11 is the "InLiner Robot" developed by Husky Injection Molding Company, Ltd. in or around 1998.

With reference to FIG. 11, an isometric view of an injection molding machine 10 is shown. The injection molding machine comprises an injection unit 11, a stationary platen 12, and a moving platen 15. Also included is an injection mold comprising two halves 21 and 22: (i) the cavity half 21 attached to the stationary platen 12 of the machine 10, and (ii) the core half 22 attached to the moving platen 15 of the machine 10. A clamp block 18 attaches a hydraulic cylinder 16 to the machine 10, said hydraulic cylinder 16 being attached to said moving platen 15 by a column 17. Tie bars 19 attach the clamp block 18 to the stationary platen 12, and are secured using retaining nuts 20.

An in-line type robot is provided on the injection molding machine, and comprises a robot carriage 33 traveling along a single horizontal axis of travel 30 (also known as an "X beam"), a mounting block 31, and a support post 28 attached to the machine base 13. This InLiner Robot was mounted on a two platen clamp assembly. One end of its X beam (which has a travel axis for the robot that is parallel to the axis of the clamping motion) was attached to stationary platen 12, with the other end extending beyond the end of the clamping assembly and supported by the vertical post 28 attached to the injection molding machine base 13.

The InLiner robot carriage 33 travels along the X beam 30, and further includes a vertical "Y beam" 34 that extends on the non-operator side of the machine and rides upon a carriage 21. A part gripper (not shown) is provided on the Y beam for removing molded parts from the mold halves. The robot is typically moved along the X beam by a servo-electric driven belt drive.

A number of disadvantages are present in the in-line robot configurations described in the U.S. patent and PCT published application described above, and with respect to FIG. 11.

First, there is a lack of stability and a lack of durability of mountings utilizing support arms attached to the base of the injection molding machine.

A second disadvantage in the in-line robot configurations described above is the requirement for support structures that extend beyond the footprint of the injection molding machine, thereby occupying valuable floor space that could otherwise be more profitably used.

Accordingly, there is a need in the art to provide an in-line robot mounting apparatus and method having at least two mounts, where at least one mount is a fixed mount and at least one mount is a flexible mount. There is also a need in the art for a method and apparatus for mounting an in-line robot on an injection molding machine using at least one stationary mount and at least on flexible mount, where said stationary mount is provided on a stationary platen, and said flexible mount is provided on a clamp assembly.

SUMMARY OF THE INVENTION

According to a first aspect of the present invention, structure and/or steps are provided for mounting a robot on an injection molding machine. An injection molding machine comprising a stationary platen, a moving platen, and a clamp assembly, a robot, and a mounting assembly for movably attaching said robot to said injection molding machine are provided. The mounting assembly comprises a mounting block affixed to said stationary platen, a flexible mounting affixed to said clamp assembly, and a beam extending between said mounting block and said flexible mounting.

According to a second aspect of the present invention, structure and/or steps are provided for a mounting assembly for a robot. The mounting assembly comprises a fixed mounting block affixed to a stationary portion of an apparatus, a flexible mounting affixed to a non-stationary portion of an apparatus, and a beam extending between said fixed mounting block and said flexible mounting. The beam provides one of the axes of travel for the robot.

According to a third aspect of the present invention, structure and/or steps are provided for a flexible mounting for attachment of a member to a non-stationary surface. The flexible mounting comprises a first structure for fastening to said non-stationary surface, a second structure for fastening to a member to be attached to said non-stationary surface, a spacer for extending between said first and second structures for fastening, a first connector for connecting said spacer to said first structure for fastening, and a second connector for connecting said spacer to said second structure for fastening. The first and second structures for fastening said member to said non-stationary surface permit said member and said non-stationary surface to be securely attached regardless of changes in position of said non-stationary surface with respect to said member.

According to a fourth aspect of the present invention, a method of mounting a robot on an injection molding machine, comprises the steps of providing a fixed mounting on a stationary portion of said injection molding machine, providing a flexible mounting on a non-stationary portion of said injection molding machine, providing a beam between said fixed mounting and said flexible mounting, and movably attaching a robot to said beam.

Thus, the present invention advantageously provides a method and apparatus for flexibly mounting a robot on an injection molding machine.

BRIEF DESCRIPTION OF THE DRAWINGS

Exemplary embodiments of the present invention will now be described with reference to the accompanying drawings in which.

DETAILED DESCRIPTION OF THE PRESENTLY PREFERRED EXEMPLARY EMBODIMENTS

1. Introduction

The present invention will now be described with respect to embodiments in which an injection molding machine has a robot or other movable device mounted thereon, and where methods are provided for mounting a device on an injection molding machine subject to tensile forces, i.e., expansion and compression. The mounting according to this invention includes at least one fixed mounting and at least one flexible mounting, and may include as many additional flexible and fixed mountings as desired to provide optimum stability of the mounted device. The number of mountings may vary based on the size of the injection molding machine, the weight of the device being mounted, and other factors familiar to those skilled in the art. According to a presently preferred embodiment, one flexible mounting and one fixed mounting are used to mount an in-line robot to an injection molding machine, however, from about one to about three mountings may be utilized according to the present invention. Preferably, mountings are spaced as far apart as is practical, for optimum stability.

When used to mount a device on an object, such as an injection molding machine, that is subject to expansion and compression, the mountings of the present invention provide a stable means for affixing the device to the object. The stability of the mounting is due at least in part to the fact that the use of one or more flexible mountings allows the device to accommodate stretching and compressing forces being exerted by the object to which it is attached. Stability is also imparted by the construction of the mountings according to the present invention, which allow movement only in the direction of the tensile force, and not, for example, from side to side.

In the specific context of the injection molding machine, the distance between the clamp block, which incorporates a clamp for exerting pressure on the mold halves to maintain them in a closed position for the injection molding operation, and a stationary platen, which bears one of the mold halves, is not constant. This distance may vary from between about one foot to about twenty feet, in accordance with the present invention, and depends on the size of the machine and the opening distance of the mold. When the clamp is engaged to close the mold halves, tie bar expansion pushes the clamp block in a direction opposite to the direction in which the clamp is exerting force on the mold halves. The flexible mounting of the present invention permits a device, such as an in-line robot, to be mounted on an injection molding machine subject to expansion and compression while preventing any distortions in the device that might result in the alignment of the device being compromised. For example, when an in-line robot is mounted on an injection molding machine, it is preferred that the axis of travel of the robot be oriented such that it is parallel to the direction of the force being exerted by the mold clamp. This orientation is preferred because it permits the discharge of the molded parts at the end of the injection molding machine rather than at the side. This discharge position allows multiple injection molding machines to be spaced closer together in rows, as space between them need not be reserved for part handling. Use of non-flexible mountings could result in distortions in the axis of travel caused by the inability of the non-flexible mounting to accommodate expansion and compression of the injection molding machine that render the axis of travel non-parallel to the direction of the force. This shifting in the orientation of the axis of travel could result in misalignment of the robot discharge position with respect to the downstream handling equipment designed to accept the discharged parts into fixtures and the like for subsequent downstream processing. The flexible mountings of the present invention prevent this situation from arising.

The mounting apparatus and methods according to the present invention are designed to provide a stable and secure platform upon which a device may operate despite stretching and contracting of the apparatus to which it is mounted. For example, the methods and apparatus of this invention are useful for mounting an in-line robot that removes finished molded articles from mold halves of an injection molding machine. Nevertheless, it should be understood that the teachings and claims of the subject invention are equally applicable to mounting of devices other than in-line robots, which may also be mounted on injection molding machines or other objects that are subject to expansion and contraction forces. For example, the present invention will find applicability in many technologies relating to injection molding, including mounting of devices for cleaning molds, mounting of devices for cooling molded parts, etc.

2. The Structure of the First Embodiment

The structure of a presently preferred embodiment of an apparatus according to the invention will be described in greater detail with respect to the drawings.

Figure 1:
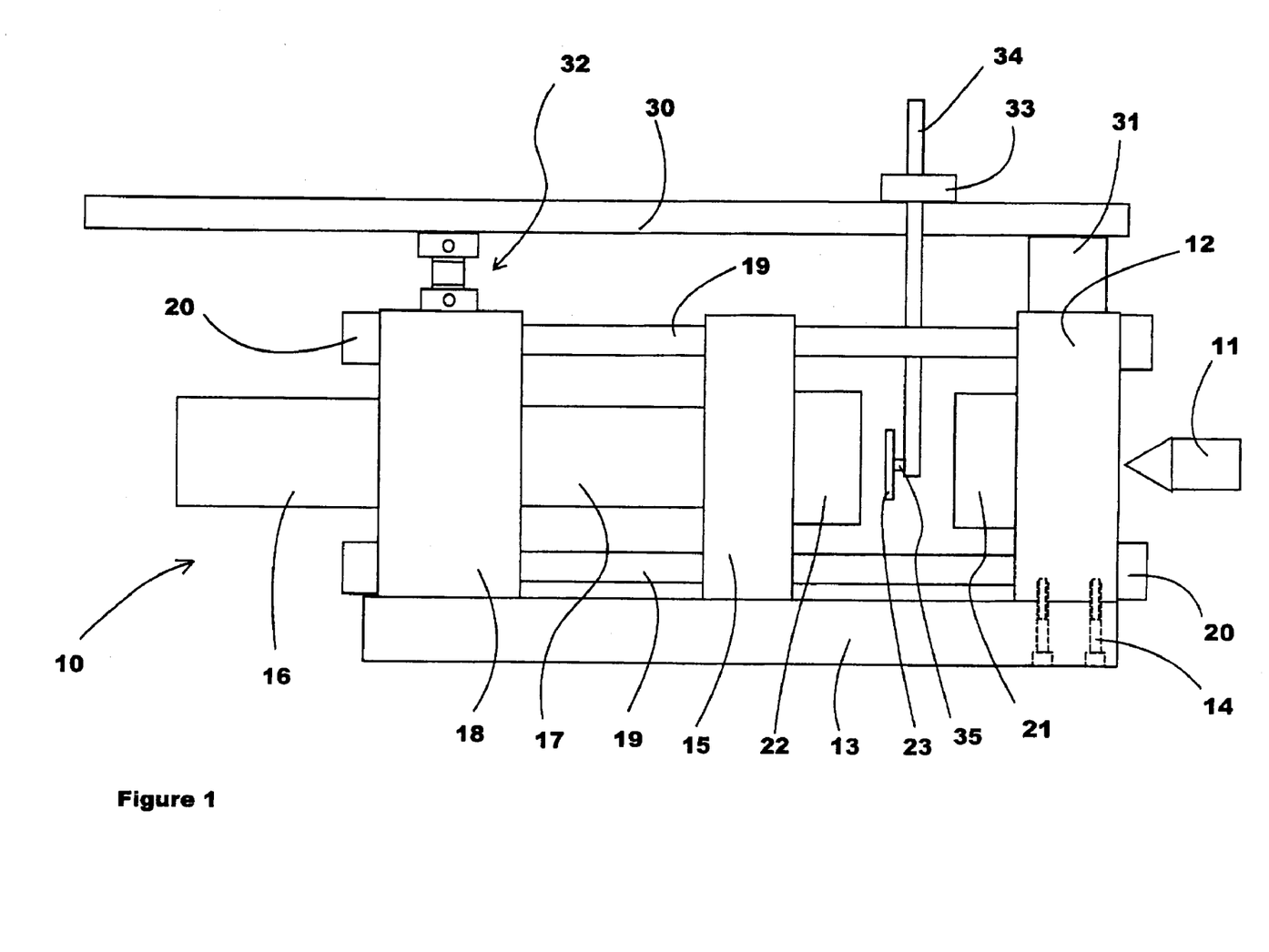
FIG. 1 is a side view of an injection molding machine clamp with an in-line robot mounted to the stationary platen and clamp block. The mold is in the open position and the robot gripper is in between the mold halves having captured a molded part.

FIG. 1 shows an injection molding machine 10 comprising and injection unit 11, stationary platen 12 fixed to base 13 by screw means 14, and a moving platen 15 that slides along the base and is connected to hydraulic cylinder 16 by column 17. The cylinder 16 is mounted to clamp block 18 that is connected to the stationary platen 12 by a plurality of tiebars 19 which are retained in said clamp block and stationary platen by nuts 20 on each end of the tiebar. A mold half is attached to each platen, where the preferred configuration includes a cavity mold half 21 attached to the stationary platen 12 and a core mold half 22 attached to moving platen 15, such that when the moving platen is moved by cylinder 16 toward the stationary platen until it touches the cavity mold half 21, a closed mold is formed by the two mold halves 21 and 22. By injecting plastic into the closed mold a molded article 23 can be formed.

Figure 4:
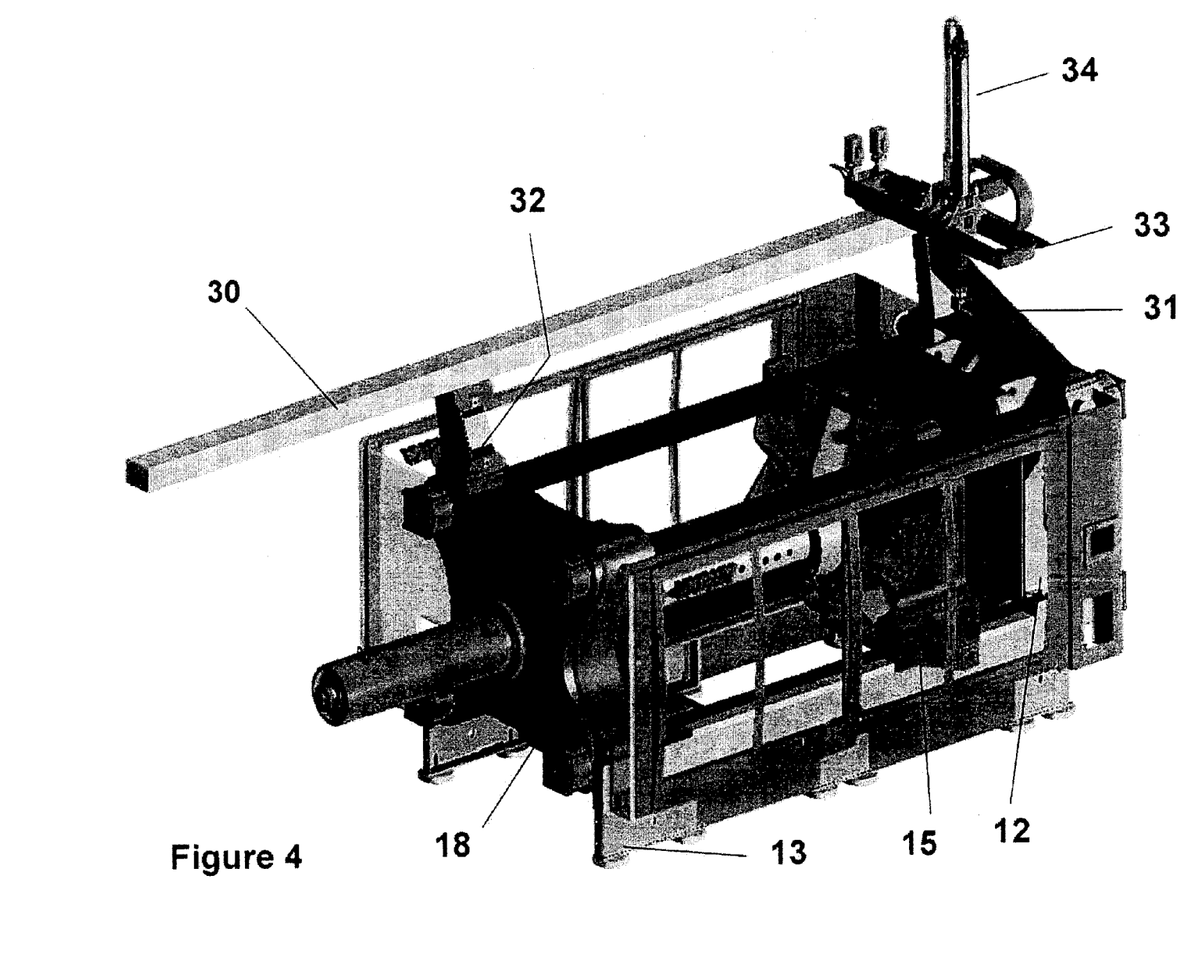
FIG. 4 is an isometric view of the machine clamp and robot assembly of FIG. 1.

FIG. 1 also shows a robot assembly mounted atop the machine 10, comprising a horizontal or "Z" beam 30 that is fastened to the top of stationary platen 12 by a fixed mounting block 31. The Z beam is supported and spaced between about 4 inches and about 3 feet high above the stationary platen 12 by fixed mounting block 31. Preferably, one fixed mounting block 31 is used to provide a stable mount. The mounting block 31 may be formed of any material of suitable strength for supporting the robot and able to be securely attached to machine 10. Presently preferred embodiments of the invention include mounting blocks comprising metals, including steel and high speed steel, high density plastics, and other suitable materials. The Z beam 30 is typically approximately between eight feet to approximately thirty feet long, but its length may vary depending on the size of the machine and the mold opening stroke. The Z beam 30 is supported and spaced between about four inches and about three feet high above the clamp block 18 by flexible mounting assembly 32. Preferably, between about one and about three flexible mounting assemblies 32 are used to provide a stable mount. Flexible mounting assembly 32 may also be formed of any material of suitable strength to support the robot and be securely attached to machine 10. However, the flexible mounting assembly 32 must also be capable of flexing or bending in response to stretching and/or compression of the tie bars and the resultant movement of the clamp block 18 with respect to the stationary platen 12. A presently preferred embodiment of the invention includes flexible mountings comprising pins permitting rotation about a spacer disposed between the pins, but other embodiments are also envisioned according to the present invention, as will be set forth more fully below. The spacer may have bronze bushings of other lubricant impregnated materials through which the pins are installed. FIG. 4 shows an isometric view of the injection molding machine and robot assembly described above with respect to FIG. 1.

Figure 5:
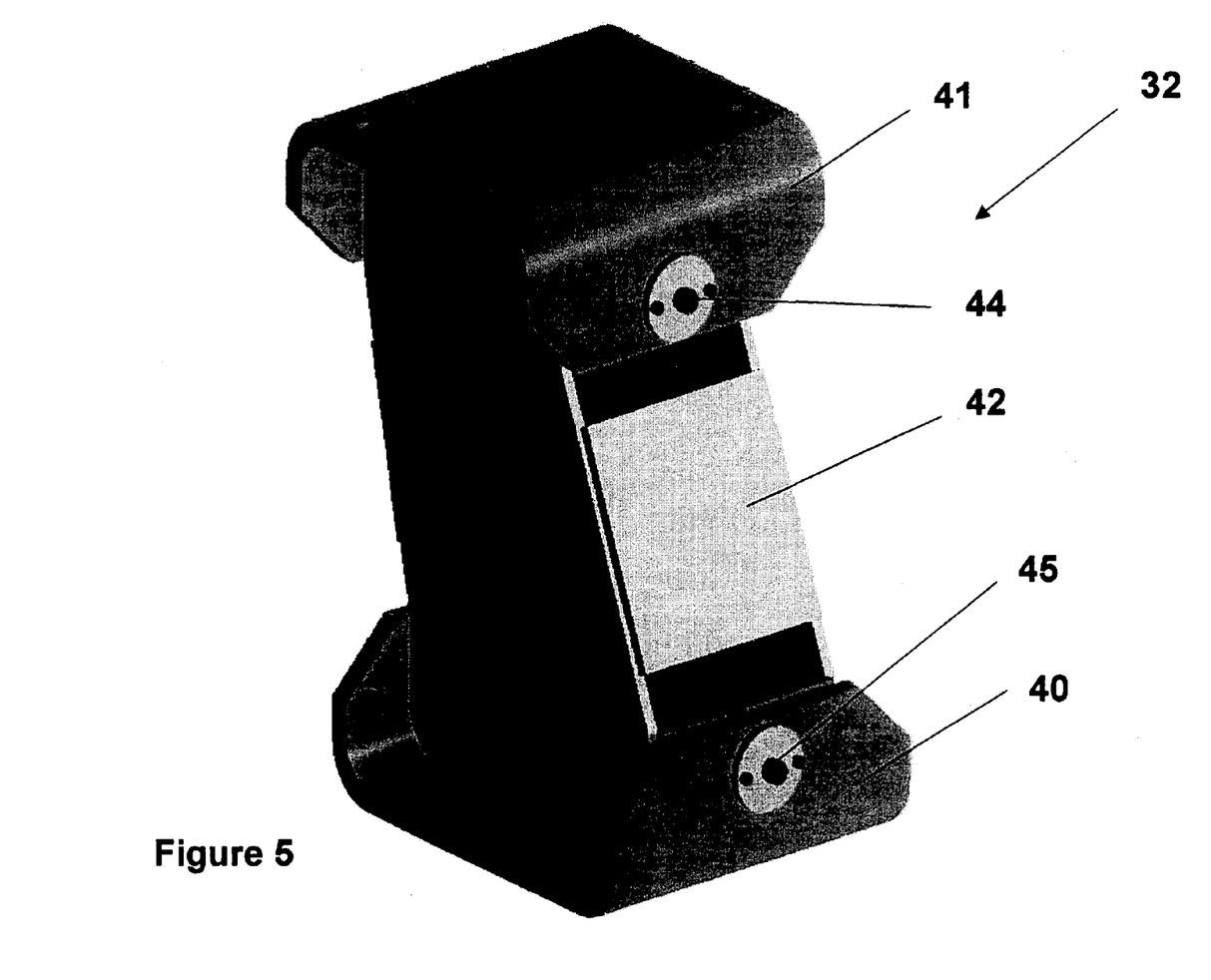
FIG. 5 is a close-up isometric view of the mounting block for the robot X beam of FIG. 1.

FIG. 5 shows a more detailed, isometric view of the flexible mounting assembly 32 according to the presently preferred embodiment. The flexible mounting assembly 32 includes upper part 41 and lower part 40 adapted for attachment to the Z beam and injection molding machine, respectively. The upper and lower parts 40 and 41 include pins 44 and 45 which permit rotation about their axes. Disposed between the pins 44 and 45 is a connecting means 42, which may be a spacer constructed of any material of sufficient strength to support the Z beam and in-line robot without flexing, warping, or otherwise compromising the alignment of the axis of movement of the Z beam with respect to the axis of the clamping force.

Connecting means 42 connects the lower part 40 of the mounting assembly 32 to the upper part 41 and comprises in the presently preferred embodiment a spacer frame 43, an upper pivot pin 44, and a lower pivot pin 45. The axis of both pins 44 and 45 is parallel to each other and perpendicular to the clamp axis and Z beam 30 longitudinal axis. The ends of each pivot pin are respectively and accurately located in the upper part 41 and lower part 40 of the mounting assembly 32 so that the spacer frame 43 is only permitted to rotate about both pins, with said rotation occurring only in the vertical plane. This ensures that the Z beam 30 is maintained in parallel alignment, in the vertical plane, with the clamp axis regardless of the amount of tiebar stretch and consequent relative movement of the clamp block 18 with respect to the Z beam 30.

3. The Process of the First Embodiment

The method of operation of the apparatus of the present invention will be described with respect to FIGS. 1–3.

During basic operation, robot carriage 33 travels horizontally along the Z beam and is moved by motive means (not shown). The carriage 33 carries vertically movable Y beam 34 that is moved by a second motive means (not shown). The motive means for use in connection with movement of the Z and Y beams may include, for example, a belt drive, or a rack and gear drive, or cylinder, which may be powered by, for example, a servo-electric motor, or pressure fluid means.

Part gripper 35 is attached to the lower end of Y beam 34 such that the gripper 35 can hold molded article 23 by any conventional means. According to a presently preferred embodiment, the part gripper 35 comprises a suction cup, a magnetic chuck, a mechanical gripping arm, etc. FIG. 1 depicts the robot gripper 35 holding the freshly molded article 23 which has been ejected from the core half 22 of the open mold. When the mold is open, no tiebar stretch is caused because no clamping force is being exerted, and the clamp block 18 and flexible mounting 32 are in their normal, non-stressed positions.

Figure 2:
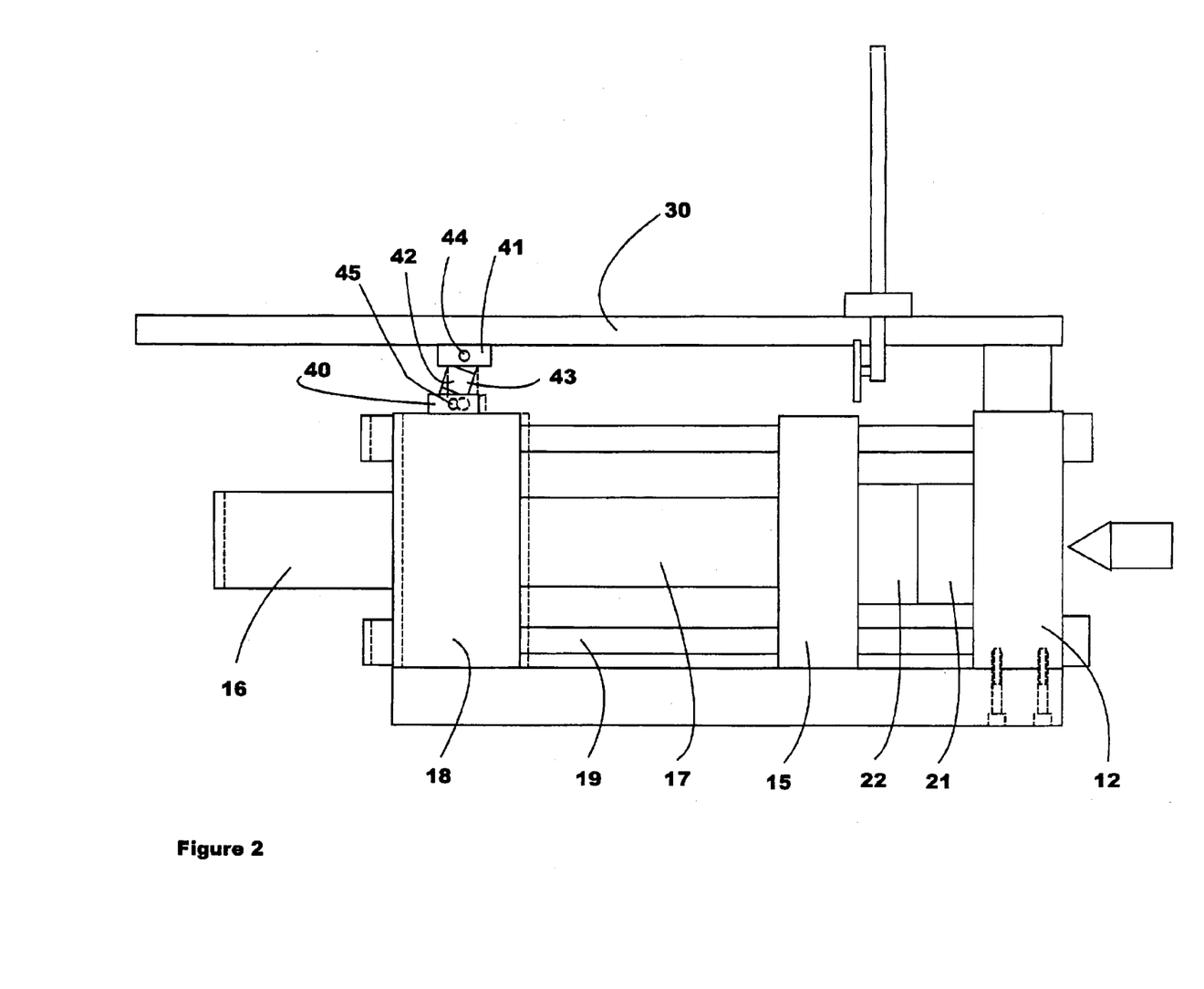
FIG. 2 is a side view of an injection molding machine clamp with an in-line robot mounted to the stationary platen and clamp block. The robot gripper and the attached molded part are positioned above the closed and clamped mold.

In FIG. 2, the molded article 23 has been lifted from the mold in preparation for removal from the injection molding machine. During this process, the mold has closed and the clamping force being exerted causes tiebar stretch to occur, as illustrated by the shift in the position of clamp block 18 and the movement of flexible mounting 32 to accommodate the shift. Typical clamping forces exerted by the injection molding machine range from about 20 tons to about 10,000 tons, but these forces vary depending on the machine size, the mold being operated at the time, and other factors known to those skilled in the art. The flexible mounting allows the spacer 42 to pivot about pins 44 and 45 so that the changes in the distance between the stationary platen 12 and the clamp block 18 do not cause misalignment of the Z beam 30 with respect to the direction of the clamping force. At this stage, the closed mold is ready for an injection molding operation to occur.

Figure 3:
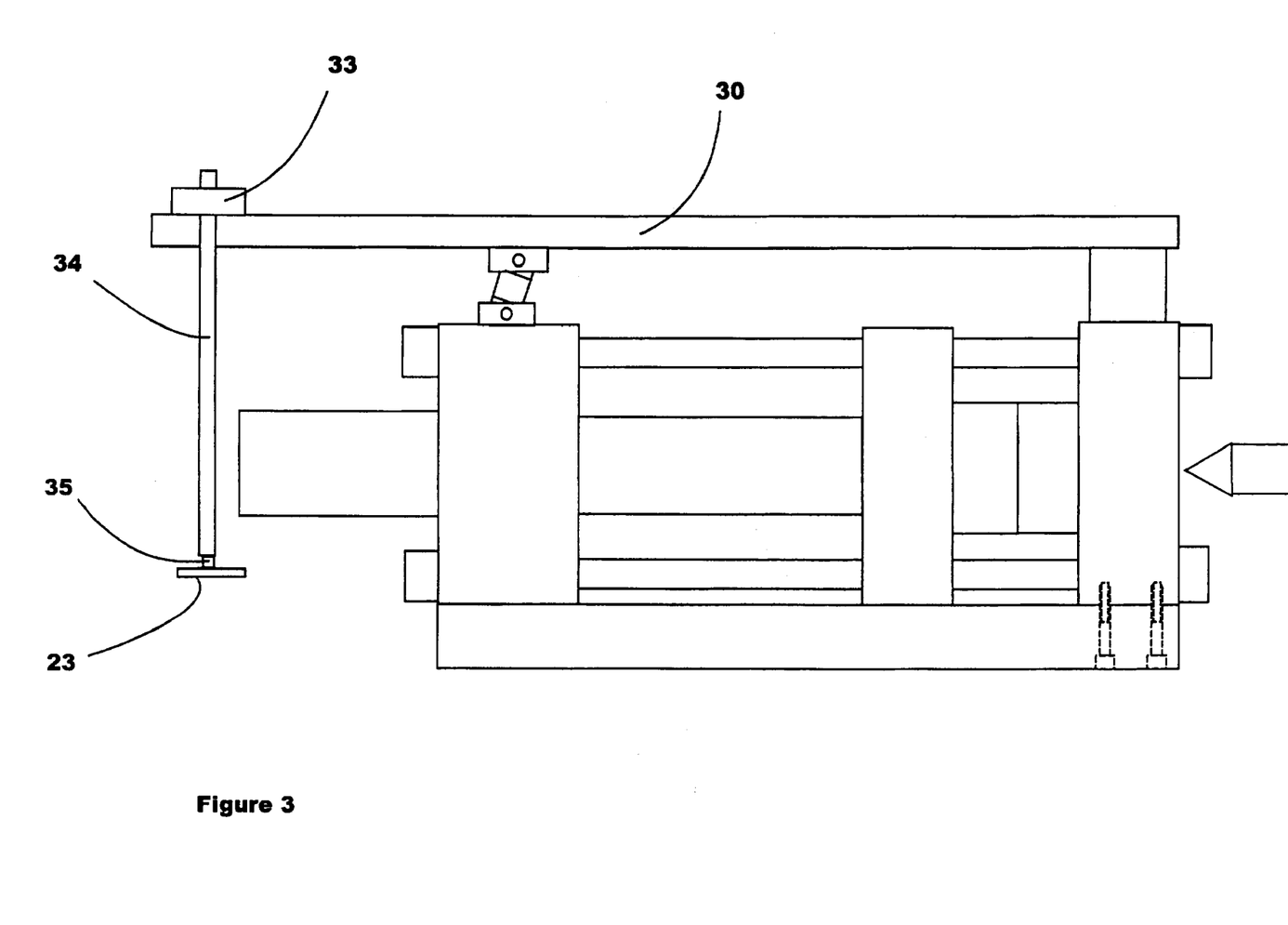
FIG. 3 is a side view of an injection molding machine clamp with an in-line robot mounted to the stationary platen and clamp block. The robot gripper and the attached molded part are positioned behind the clamp at the unloading station with the mold closed and clamped.

In FIG. 3, the robot carrier 33 has moved along the Z beam 30 to position the Y beam 34, gripper 35 and molded article 23 to the unloading position where the gripper 35 releases the molded article 23. Meanwhile, injection molding of the next molded article is being carried out. FIG. 3 shows that the injection molding machine clamp is in the closed and clamped position as the molding cycle continues. After the release of molded article 23 and the completion of the molding cycle, tiebar stretch diminishes, the flexible mounting 32 and Z beam 30 return to their unstretched positions, and the robot returns the gripper to the loading position shown in FIG. 1. This cycle may be repeated as often as molding operations are carried out.

As discussed above, FIG. 2 shows the molding machine clamp in the closed and clamped position ready to start the next molding cycle. The two mold halves 21 and 22 are closed and cylinder 16 is exerting a clamping force applied via the column 17 against the moving platen 15 that presses the two mold halves against the stationary platen 12. The tiebars 19 connecting the stationary platen 12 to the clamp block 18 resist this clamping force. In so doing the tiebars 19 are stretched and clamp block 18 slides away from the stationary platen 12 by an amount typically between about 0.020" and about 0.040", but may be as small as about zero or as large as about 0.060" This movement is called tiebar stretch. This growth in length of the tiebars can be calculated as follows:

$$\text{Tiebar stretch} = \frac{\text{Length of unloaded tiebar} \times \text{Clamp force}}{\text{Combined cross sectional area of tiebars} \times \text{Modulus of Elasticity of Tiebar material}}$$

FIG. 2 shows the cylinder 16 and clamp block 18 in their stretched positions with their original, unstretched positions shown as dotted lines. It is clear from the drawing that the Z beam 30 mounting assembly 32 must accommodate this tiebar stretch as the lower part 40 of the assembly is fastened to the clamp block 18 which has changed position, while the upper part of the assembly 41 is fastened to the Z beam 30 which has not changed position because it is not subjected to the clamping force causing the tiebars to stretch. The flexible mountings of the present invention are all beneficial in making this accommodation while preventing undesirable movement in other directions.

In addition to the effects of tiebar stretch, clearly the Z beam 30 may also change its height with respect to the clamp block 18 as the spacer frame 43 moves through its arc of rotation in the vertical plane. However, this slight height change of the Z beam 30 is not significant with regard to the operation of the robot or the alignment of the gripper 35. The height change of the Z beam 30 can be calculated as follows:

$$h = d - \sqrt{d^2 - s^2}$$

Where
h=height change
d=distance between pivot pins 44 and 45
s=tiebar stretch The larger the distance (d) the Z beam 30 is above the clamp block 18 the less significant is the height change (h) for a given amount of tiebar stretch (s). For example, if the tiebar stretch is 0.040" and the distance between the pivot pins is 24", the height change is 0.000033", an amount of no significance when compared to the manufacturing tolerances used in this configuration. Although the height change is not significant, it is envisioned according to alternate embodiments of the present invention that it can be eliminated by using flexible mountings that allow horizontal movement without requiring vertical shifts, as will be described herein.

Also envisioned according to the present invention is a method for mounting a device, such as an in-line robot, on an apparatus subject to expansion and contraction, such as an injection molding machine. The method includes providing at least one fixed mounting on a stable, non-moving portion of the apparatus, and providing at least one flexible mounting on a portion of the apparatus that shifts position due to the expansion and contraction. The device is then affixed to the mountings in a manner that permits the flexible mounting to move to accommodate the degree of expansion or contraction experienced by the apparatus. Such a method of mounting is useful in any context where it is necessary to provide accurate, stable mounting of equipment that is not subjected to tensile forces on apparatus that are subject to such forces.

4. The Structure and Method of the Second Embodiment

Figure 6:
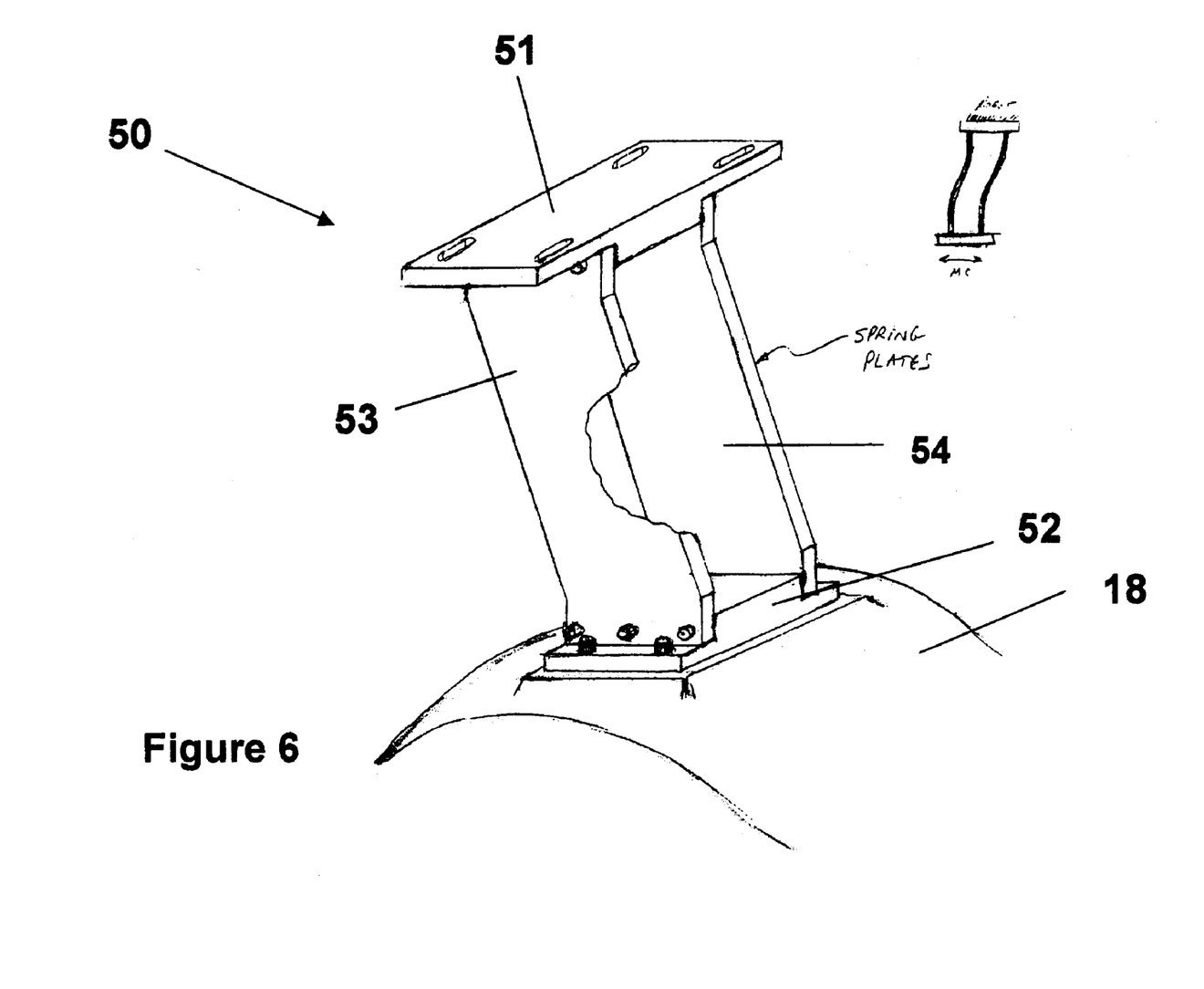
FIG. 6 is a close-up isometric view of an alternate embodiment of a flexible mounting block.

FIG. 6 shows an isometric view of an alternate embodiment according to the present invention. A flexible mounting assembly 50 is mounted on clamp block 18. The structure comprises an upper part 51 that fastens to the Z beam 30 and lower part 52 that fastens to the clamp block 18. Two spring plates 53 and 54 space the upper part from the lower part, and the spring plates are fastened to both the upper and lower parts by a fastening device that may include a pin, a bolt, or other suitable fastening means.

The material of the spring plates exhibits a spring like property that allows the plates to deflect transversely when the clamp block 18 moves as a result of tiebar stretch caused by the application of the clamping force. This deflection occurs only in the vertical plane thereby ensuring the Z beam 30 is maintained in parallel alignment (in the vertical plane) with the clamp axis, regardless of the amount of tiebar stretch and consequent relative movement of the clamp block 18 with respect to the Z beam 30. The spring plates are made of a material of sufficient stiffness to support the Z beam and weight of the robot carrier assembly and its payload without any substantial deflection. The spring plates may be formed from a material selected from sheet metal, and different types of steel with elastic properties that would match the desired deflection requirements.

5. The Structure and Method of the Third Embodiment

Figure 7:
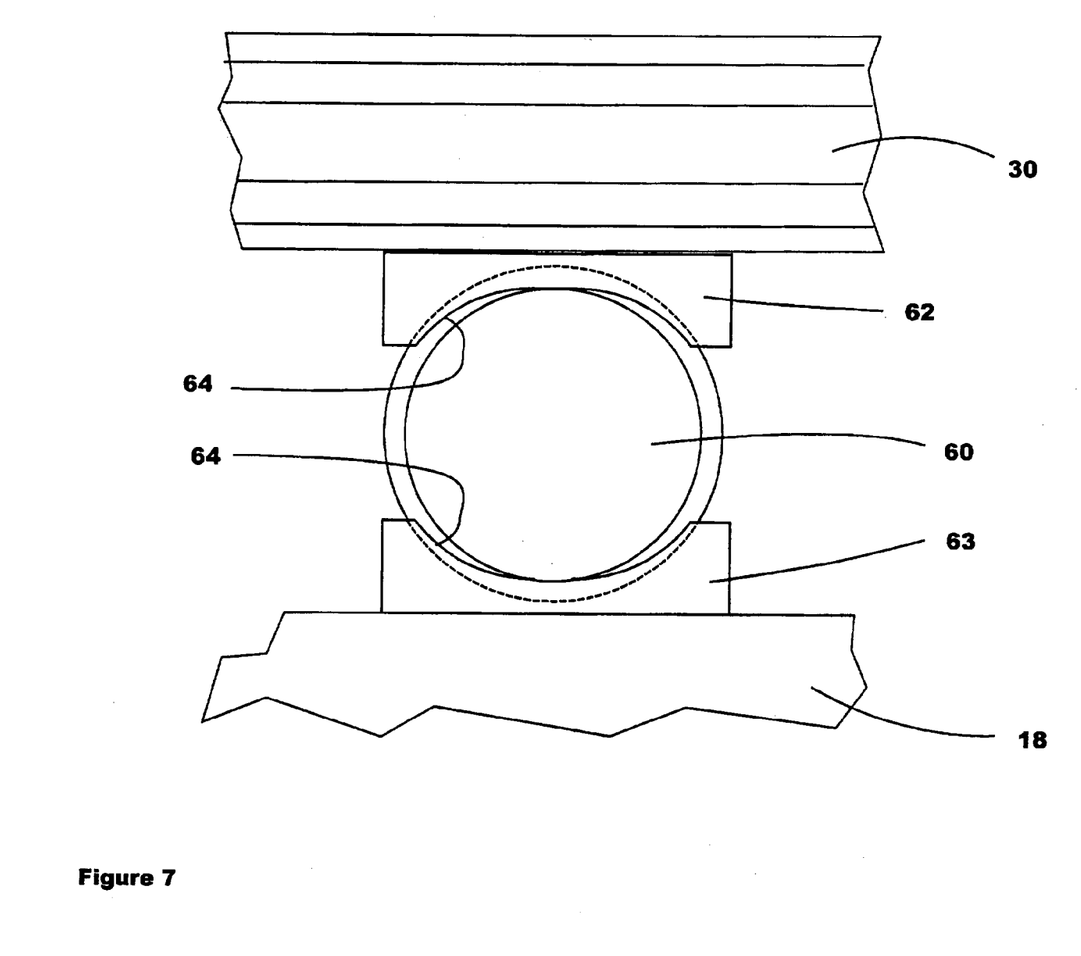
FIG. 7 is a close-up end view of another alternate embodiment of a flexible mounting block.
Figure 8:
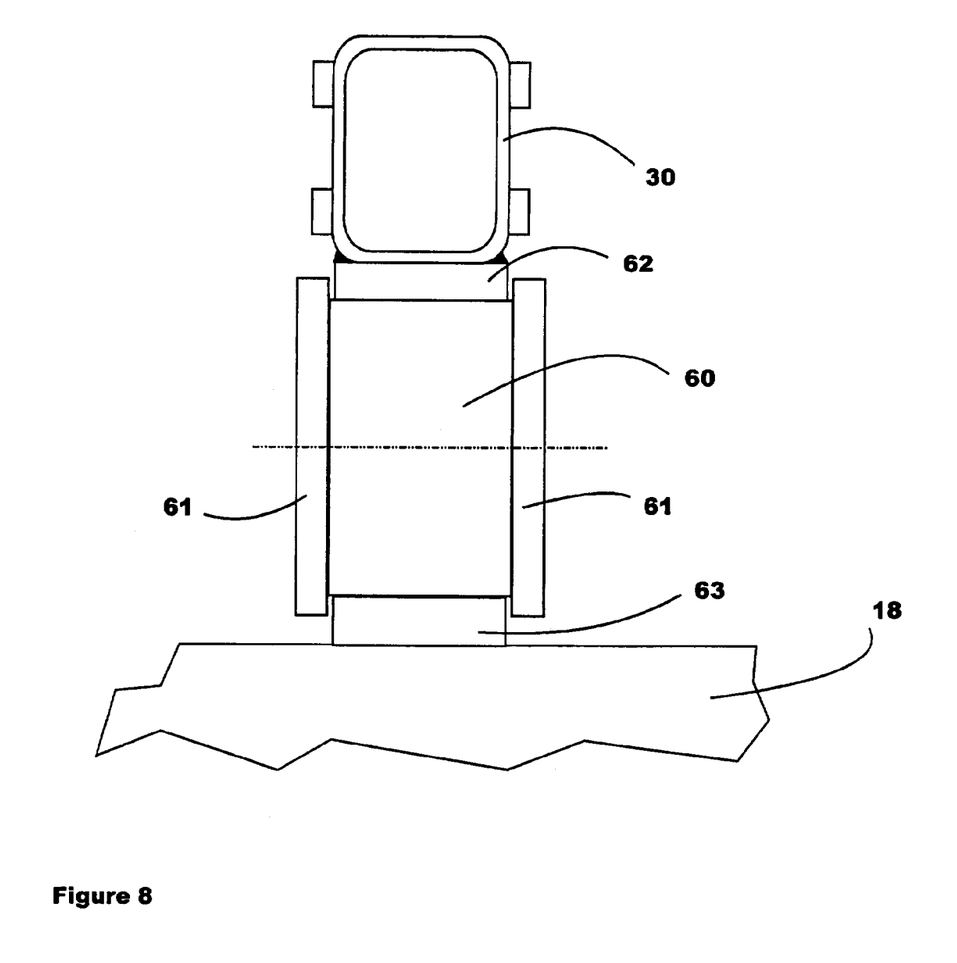
FIG. 8 is a plan view of the alternate embodiment of a flexible mounting block shown in FIG. 7.

FIGS. 7 and 8 show another alternate embodiment of the mounting assembly according to the present invention. The flexible mounting comprises a single roller 60 having flanged ends 61 that space apart two similar mounting blocks 62 and 63. These blocks have one surface 64 contoured such that the roller can move horizontally about 5 mm freely before encountering the curved portion of the surface and thereby be restrained. The flanged sides 61 of the roller keep it aligned with the sides of the blocks 62 and 63 and prevent the roller from working its way axially from between the blocks 62 and 63. During operation, when the Z beam 30 moves horizontally with respect to the clamp block 18 due to tiebar stretch, it is spaced apart from the clamp block 18 by the rolling mounting assembly which provides the advantage of not changing height as it allows the clamp block 18 to move with respect to the Z beam 30. However, the roller 60 provides only a single line of contact with its mounting blocks 62 and 63 over which the weight of the Z beam, the robot carriage and its payload must be supported. This could lead to premature wearing of the roller or the mounting block surfaces if a sufficiently durable material is not chosen for the flexible mounting. Presently preferred materials for implementing this embodiment of the present invention include steel, and lubricant impregnated materials.

6. The Structure and Method of the Fourth Embodiment

Figure 9:
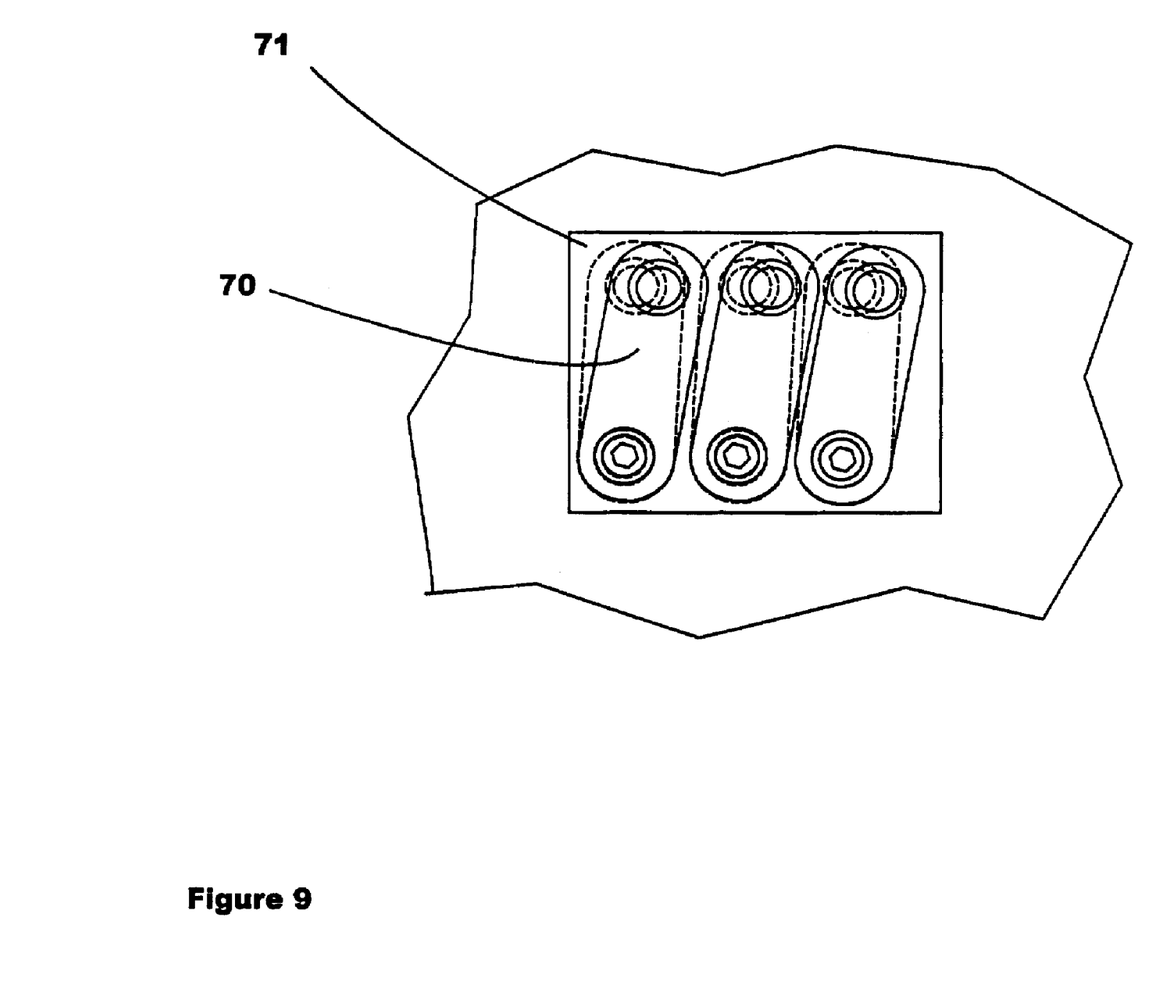
FIG. 9 is an end view of yet another alternate embodiment of a flexible mounting block.
Figure 10:
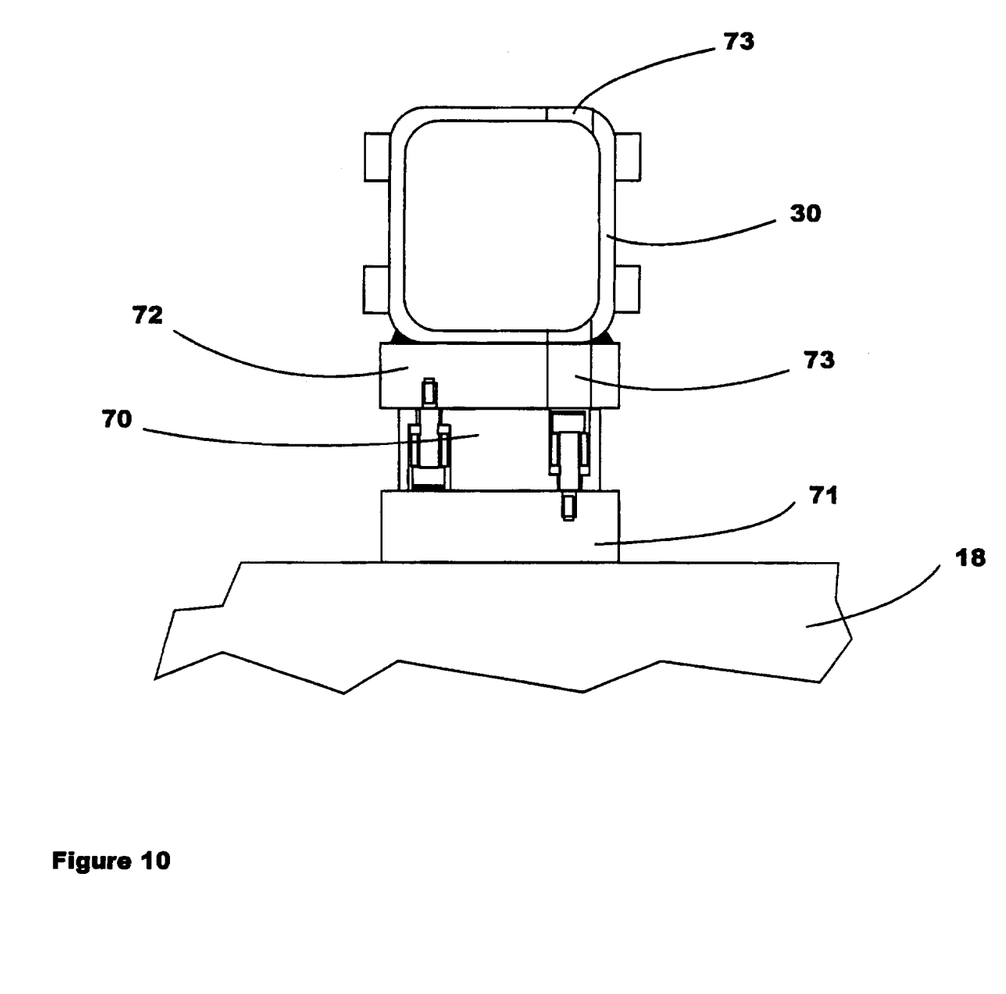
FIG. 10 is a plan view of the alternate embodiment of a flexible mounting block shown in FIG. 9.

FIGS. 9 and 10 show yet another alternate embodiment of the mounting assembly according to the present invention. It comprises at least one pivoting wear pad 70 that is pivotingly attached to the lower mounting block 71 at one of its ends and pivotingly attached to the upper mounting block 72 at the opposed end such that when the Z beam 30 moves horizontally, due to tiebar stretch with respect to the clamp block 18, the wear pad 70 pivots while supporting the weight of the Z beam, the robot carriage and its payload. Clearance holes 73 are provided in the Z beam and upper mounting block to provide access to the attaching means of the wear pivot point at one end. Multiple wear pads 70 distribute the said weight over the combined surface areas that are liberally lubricated to reduce friction. Although three such wear pads are shown in FIG. 9, any suitable number may be used. As in the previous embodiment, the height of the Z beam 30 above the clamp block 18 does not change as the tiebar shift is accommodated. However, a slight sideways displacement, similar in amount to the first embodiment, occurs due the arcuate swing of the wear pads. This displacement occurs only in the horizontal plane thereby ensuring the Z beam 30 is maintained in parallel alignment, in the horizontal plane, with the clamp axis regardless of the amount of tiebar stretch and consequent relative movement of the clamp block 18 with respect to the Z beam 30.

7. Conclusion

Thus, what has been described is a method and apparatus for flexibly mounting an in-line robot to an injection molding machine such that the mounting can accommodate tiebar stretch. The present invention also provides a flexible mounting for attaching a member to a surface that is subject to compression and expansion forces.

Advantageous features according the present invention include: 1. The flexible mounting permits the in-line robot to be mounted directly on the injection molding machine, rather than attached to its base; 2. The flexible mounting allows vertical movement of the beam that is the axis of travel for the in-line robot, so that the beam is able to accommodate tiebar stretch without deviating from its axis of travel, which is parallel to the movement of the hydraulic cylinder of the injection molding machine; and 3. The mounting method is contained within the envelope of the injection molding machine and does not increase its footprint in any way. Additional advantages include the ability to position the support beam lower with respect to the injection molding machine, which results in better stiffness and rigidity, as well as a reduced material cost and the ability to manufacture the item on a smaller machine tool, which reduces production cost.

While the present invention improves the mountings of in-line robots provided on injection molding machines, those skilled in the art will realize the invention is equally applicable to other applications where it is desirable to include a robot assembly to aid in removing parts from manufacturing apparatus that are subject to expansion and contraction, thereby making it difficult to stably mount the robot assembly.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents discussed above are hereby incorporated by reference into the Detailed Description of the Preferred Embodiments.

What is claimed is:

1. A robot flexibly mounted on an injection molding machine comprises:
   an injection molding machine comprising;
      a first stationary machine component;
      a moving platen;
      and second stationary machine component;
      a plurality of tiebars; and
      said plurality of tiebars interconnecting said first stationary machine component and said second stationary machine component of said injection molding machine;
   a robot;
   a mounting assembly;
   said mounting assembly including a beam and a flexible mount;
   said robot mounted on said beam and said beam mounted to said first stationary machine component of said injection molding machine; and said flexible mount intermediate said beam and said second stationary machine component wherein said flexible mount is flexible about a vertical axis for maintaining parallel alignment in response to horizontal relative movement.

2. The robot according to claim 1, further comprising:
a fixed mount, said fixed mount intermediate said beam and said first stationary machine component.

3. The robot according to claims 1 or 2, wherein said first stationary machine component is a stationary platen.

4. The robot according to claims 1 or 2, wherein said first stationary machine component is a clamp block.

5. The robot according to claims 1, or 2, wherein said second stationary machine component is a stationary platen.

6. The robot according to claims 1, or 2, wherein said second stationary machine component is a clamp block.

7. The robot according to claims 1 or 2, wherein said flexible mount includes:
a first fastening structure;
a second fastening structure; and
a flexible section disposed intermediate said first fastening structure and said second fastening structure wherein said flexible section maintains said first fastening structure parallel with said second fastening structure.

8. The robot according to claim 7, wherein said flexible section is a flexible spacer, said flexible spacer connected to said first fastening structure by a pivot pin and said flexible spacer connected to said second fastening structure by a second pivot pin.

9. The robot according to claim 7, wherein said flexible section is a pair of spring plates, said pair of spring plates connected to said first fastening structure by fasteners and said pair of spring plates connected to said second fastening structure by fasteners.

10. The robot according to claim 7, wherein said flexible section is a roller, said first fastening structure has a contoured surface and said second fastening structure has a contoured surface wherein said roller is disposed between said contoured surfaces.

11. The robot according to claim 10, wherein said roller includes flanged ends retaining said roller with said first fastening structure and said second fastening structure.

12. The robot according to claim 7, wherein said flexible section is at least one pivot support, said pivot support intermediate said first fastening structure and said second fastening structure.

13. A mounting assembly for an injection molding machine comprising:
a robot operatively and flexibly mounted to the injection molding machine;
a beam; and
a flexible mount;
said flexible mount disposed intermediate a first stationary machine component of said injection molding machine and said beam;
said beam for mounting said robot wherein said flexible mount is flexible about a vertical axis for maintaining parallel alignment in response to horizontal relative movement, in use, of said first stationary machine component.

14. The mounting assembly according to claim 13, further comprising:
a fixed mount for disposing intermediate said beam and a second stationary machine component of said injection molding machine.

15. The mounting assembly according to claims 13 or 14, wherein said flexible mount includes:
a first fastening structure;
a second fastening structure; and
a flexible section disposed intermediate said first fastening structure and said second fastening structure wherein said flexible section maintains said first fastening structure parallel with said second fastening structure.

16. The mounting assembly according to claim 15, wherein said flexible section is a flexible spacer, said flexible spacer connected to said first fastening structure by a pivot pin and said flexible spacer connected to said second fastening structure by a second pivot pin.

17. The mounting assembly according to claim 15, wherein said flexible section is a pair of spring plates connected to said first fastening structure by fasteners and said pair of spring plates connected to said second fastening structure by fasteners.

18. The mounting assembly according to claim 15, wherein said flexible section is a roller, said first fastening structure has a contoured surface and said second fastening structure has a contoured surface wherein said roller is disposed between said contoured surfaces.

19. The mounting assembly according to claim 18, wherein said roller includes flanged ends retaining said roller with said first fastening structure and said second fastening structure.

20. The mounting assembly according to claim 15, wherein said flexible section is at least one pivot support, said pivot support intermediate said first fastening structure and said second fastening structure.

21. A flexible mount for use with a mounting assembly on an injection molding machine comprising:
a robot operatively and flexibly mounted to the injection molding machine;
a first fastening structure for connection to a beam;
a second fastening structure for connection to a stationary component of an injection molding machine; and
a flexible section,
said flexible section disposed intermediate said first fastening structure and said second fastening structure wherein said flexible section, in use, is flexible about a vertical axis for maintaining said first fastening structure parallel with said second fastening structure.

22. The flexible mount according to claim 21, wherein said flexible section is a flexible spacer, said flexible spacer connected to said first fastening structure by a pivot pin and said flexible spacer connected to said second fastening structure by a second pivot pin.

23. The flexible mount according to claim 21, wherein said flexible section is a pair of spring plates, said pair of spring plates connected to said first fastening structure by fasteners and said pair of spring plates connected to said second fastening structure by fasteners.

24. The flexible mount according to claim 21, wherein said flexible section is a roller, said first fastening structure has a contoured surface and said second fastening structure has a contoured surface wherein said roller is disposed between said contoured surfaces.

25. The flexible mount according to claim 24, wherein said roller includes flanged ends retaining said roller with said first fastening structure and said second fastening structure.

26. The flexible mount according to claim 21, wherein said flexible section is at least one pivot support, said pivot support intermediate said first fastening structure and said second fastening structure.

* * * * *